United States Patent [19]

Brenner et al.

[11] Patent Number: 5,177,658
[45] Date of Patent: Jan. 5, 1993

[54] HEAT FLOW DETECTOR FOR RECESSED INCANDESCENT FIXTURES

[75] Inventors: Stanley S. Brenner, Little Neck; James N. Pearse, Dix Hills; George E. Johnson, Bronxville, all of N.Y.

[73] Assignee: Leviton Manufacturing Company, Inc., Little Neck, N.Y.

[21] Appl. No.: 680,450

[22] Filed: Apr. 4, 1991

Related U.S. Application Data

[63] Continuation of Ser. No. 568,294, Aug. 13, 1990, abandoned, which is a continuation of Ser. No. 452,851, Dec. 19, 1989, abandoned, which is a continuation of Ser. No. 322,791, Mar. 13, 1989, abandoned, which is a continuation of Ser. No. 150,967, Feb. 1, 1988, abandoned, which is a continuation of Ser. No. 910,044, Sep. 22, 1986, abandoned, which is a continuation of Ser. No. 827,984, Feb. 10, 1986, abandoned, which is a continuation of Ser. No. 665,792, Oct. 29, 1984, abandoned, which is a continuation of Ser. No. 433,579, Oct. 12, 1982, abandoned.

[51] Int. Cl.$^5$ .................... H02H 5/04; F21V 23/00
[52] U.S. Cl. .................... 361/103; 337/102; 362/276; 362/295; 315/309
[58] Field of Search .................... 362/276, 294, 295; 361/103, 105; 337/102, 107; 315/309

[56] References Cited

U.S. PATENT DOCUMENTS

| 1,476,022 | 12/1923 | Phelps | 337/102 |
|---|---|---|---|
| 1,705,678 | 3/1929 | Pierce | 361/103 |
| 1,741,600 | 12/1929 | Appelberg | 337/102 |
| 3,581,985 | 6/1971 | Thorsteinsson et al. | 337/100 X |
| 3,959,762 | 5/1976 | Senor | 337/102 |
| 4,131,868 | 12/1978 | Dombrowski | 337/113 |
| 4,136,323 | 1/1979 | D'Entremont | 337/107 |
| 4,224,591 | 9/1980 | Senor | 337/102 |
| 4,236,135 | 11/1980 | Holden | 337/102 X |
| 4,388,677 | 6/1983 | Druffel | 362/276 |
| 4,400,673 | 8/1983 | Gilman | 337/380 |

Primary Examiner—Howard L. Williams
Attorney, Agent, or Firm—Paul J. Sutton

[57] ABSTRACT

A heat flow detector is described which measures a predetermined rate of heat flow in its surroundings, the surroundings being in the proximity of a recessed incandescent fixture which is designed to operate safely in the designated environment. Should the operating environment change for the fixture it will be sensed by the heat flow detector. If the operating environment becomes more dangerous so that a fire or other damage may occur the heat flow sensor will turn the incandescent lamp off and on at a slow rate to indicate the changed operating environemnt. The heat flow detector will cause a slow turn off and on if an oversize lamp is inserted in the incandescent fixture. The heat flow detector will thus prevent an overheated condition due to an oversize bulb.

7 Claims, 1 Drawing Sheet

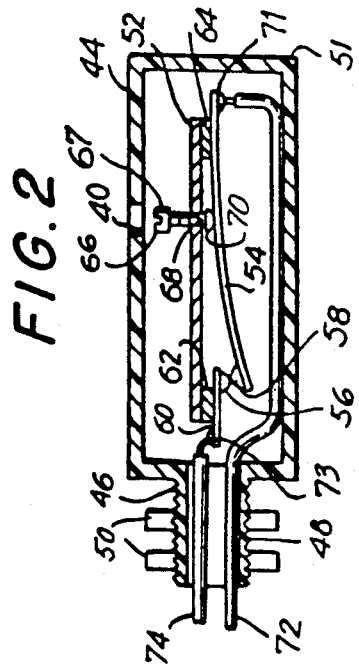
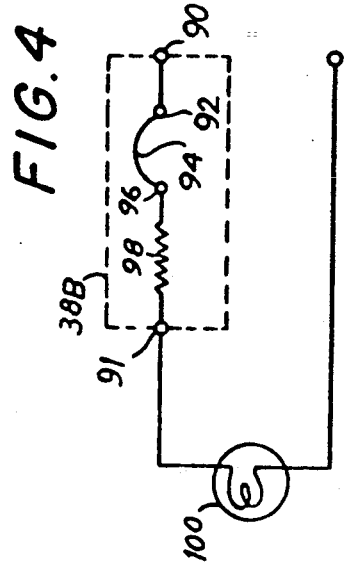
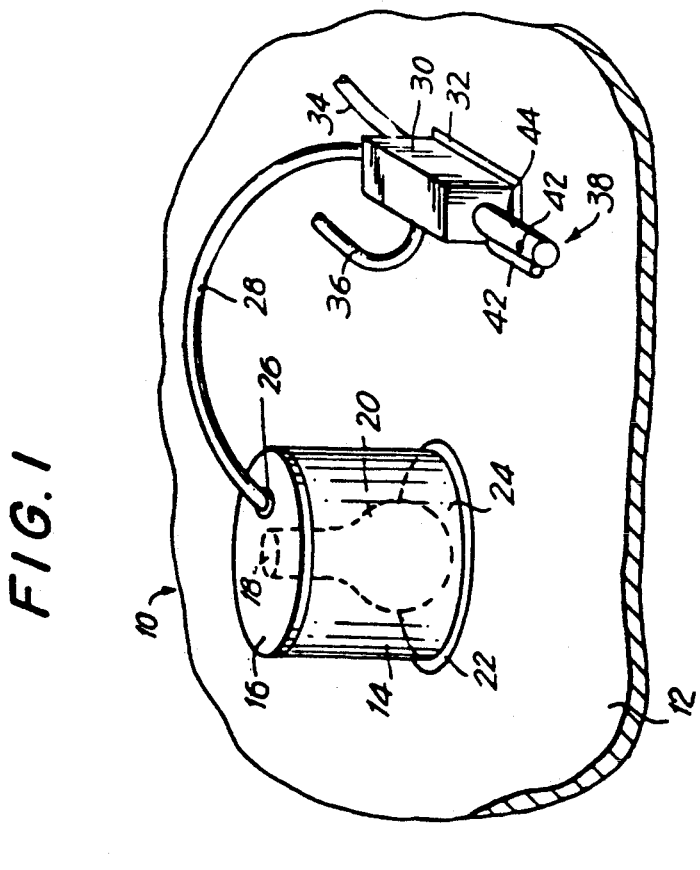
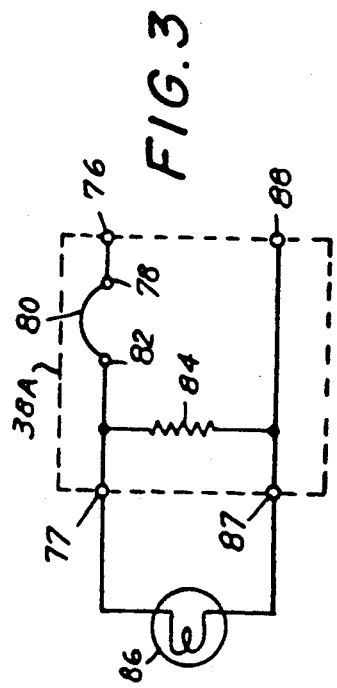

HEAT FLOW DETECTOR FOR RECESSED INCANDESCENT FIXTURES

This is a continuation of application Ser. No. 568,294 filed Aug. 13, 1990 now abandoned. Ser. No. 568,294 is a continuation of Ser. No. 452,851, filed Dec. 19, 1989 now abandoned, which is a continuation of Ser. No. 322,791, filed Mar. 13, 1989 now abandoned, which is a continuation of Ser. No. 150,967, filed Feb. 1, 1988 now abandoned, which is a continuation of Ser. No. 910,044, filed Sep. 22, 1986 now abandoned, which is a continuation of Ser. No. 827,984, filed Feb. 10, 1986 now abandoned, which is a continuation of Ser. No. 665,792, filed on Oct. 29, 1984 now abandoned, which is a continuation of Ser. No. 433,579 filed Oct. 12, 1982 now abandoned.

FIELD OF THE INVENTION

This invention relates to heat flow detectors and specifically heat flow detectors for use in protecting recessed incandescent fixtures.

BACKGROUND OF THE INVENTION

Recessed fixtures are an architecturally desireable adjunct to hung ceilings. Hung ceilings are generally designed for new and old buildings when electrical conduit and heating and ventilating ducts are placed against the ceiling of a room. In the past the space above the hung ceiling has been filled with the aforementioned equipment with air spaces around the equipment. Under these conditions the greatest danger has been overlamping. Overlamping is the condition which exists when a lamp of greater wattage than the fixture is rated for is installed. With the larger wattage lamp the heat generated is not dissappated quickly enough and the fixture temperature becomes higher than intended by the fixture designer. If the larger lamp is left in the fixture the resulting fixture temperature will rise to a point which will cause charring of plastic parts and wire insulation. Eventual deterioration of the fixture components may result in a fire. Fires from overheated fixtures have caused millions of dollars of property damage.

Recently, because of increased concern with energy conservation local and federal agencies have sponsored programs in which homes and commercial buildings are being insulated as they are built. Existing homes and commercial buildings are insulated by forcing thermal insulation into the spaces to be insulated.

Building codes require that a barrier be constructed around recessed fixtures to prevent thermal insulation from coming into contact with the fixture. For new structures the foregoing requirement is costly but feasible. The installation of barriers around recessed fixtures in existing structures is prohibitively expensive and difficult to enforce.

Materials used in the construction of recessed fixtures are thermally rated for the application. Such materials are lamps, sockets, wire and insulation to name a few. The overheating problem due to overlamping and of thermal insulation installed in contact with the fixture exists with all type of fixtures but may be particularly serious with respect to recessed incandescent fixtures.

The inventors have considered the possibility of relying upon the heat generated by the lamp in its fixture and its rate of dissipation as an indicator of safe operation. Because of the variety of fixtures and lamp sizes and the costliness of adapting each for this application the inventors have chosen the solution described by the present invention.

Safe operation of a recessed fixture depends upon the fixture dissipating a predetermined quantity of heat with its surroundings. The required heat flow is obtained by the air in contact with the fixture removing the heat. The air in contact with the fixture will heat up as it absorbs heat and the heated air, being lighter, rises allowing cooler air to flow in. This continual movement of air dependably cools the fixture. If air movement is restricted by thermal insulation a heat build up will occur resulting in a dangerous situation.

SUMMARY OF THE INVENTION

The present invention is designed to measure the rate of heat flow from a self contained heat source and to disconnect its associated fixture if the rate of heat flow is not correct. The present invention is adjusted so that it will remain operative if the rate of heat flow sensed by it is sufficient to prevent deterioration of electrical components such as plastic parts and wire insulation in its associated fixture.

Specifically the detector of the present invention uses a resistor as a heat source. The resistor heats up an enclosure within which is housed a bimetallic switch. If the rate of heat flow from the resistor is adequate the temperature of the bimetallic switch will be within operable limits causing it not to open.

Therefore, an object of the present invention is to prevent unsafe operation of its associated fixture when surrounding conditions change.

Another object of the present invention is to prevent operation of a fixture with a larger than rated lamp.

A feature of the present invention is that unsafe operation is indicated by a turning on and off of the fixture lamp.

For a better understanding of the invention, together with other details and features thereof, reference is made to the following description taken in connection with the accompanying drawings.

BRIEF DESCRIPTION OF THE DRAWINGS

FIG. 1 illustrates the present invention operatively connected to a recessed fixture;

FIG. 2 is a cross sectional view of the bimetallic switch in its enclosure,

FIG. 3 is a schematic diagram of one embodiment of the invention;

FIG. 4 is a schematic diagram of another embodiment of the invention.

DESCRIPTION OF THE PREFERRED EMBODIMENTS

FIG. 1 illustrates an application of the present invention and is generally designated 10. The application 10 shows a typical hung ceiling arrangement wherein a hung ceiling 12 supports a high hat fixture 14. High hat fixture 14 has the generally cylindrical shape of recessed fixtures. Fixture 14 has a ring 22 which supports the fixture 14 as it is centered on an opening 24 and provides the fixture 14 with access to the area below hung ceiling 12. The end of fixture 14 remote from the ring 22 is capped by a fixture end cover 16. The fixture end cover 16 can be seen to support a lamp socket 18 which has contained therein a lamp 20. When lamp 20 is on it illuminates the area below the hung ceiling 12. Contained within the fixture end cover 16 is a cable opening 26 which allows a first cable 28 access to the interior of high hat fixture 14. The first cable 28 is connected to the lamp socket 18 and supplies power to the lamp 20. The other end of the first cable 28 enters a junction box 30. Junction box 30 has a support flange 32 which is used to attach junction box 30 to the hung ceiling 12. Shown entering the junction box 30 is a second cable 34 which brings power to the lamp 20. A third cable 36 shown to the left of cables 28 and 34 connects a switch (not shown) which is typically mounted in the space below the hung ceiling 12.

Projecting from the front of the junction box 30 is a heat flow detector 38 of the present invention. The heat flow detector 38 is attached to the junction box 30 and has a resistor 42 attached in intimate proximity to a detector body 44. The detector body 44 is seen to have an adjustment opening 40 which serves to allow internal air to circulate to the outside.

FIG. 2 is a cross section through the detector body 44. The detector body 44 has at one end a neck 46 whereby the detector body 44 is attached to the junction box 30. To facilitate the aforesaid attachment the outer surface of the neck 46 is provided with a threaded surface 48 required to engage a pair of lock nuts 50. The detector body 44 has at the end remote from the neck 46 a cap 51 which closes off this end as shown. The top portion of the detector body 44 is shown with the adjustment opening 40 herein before described. Within the detector body 44 is seen a bimetallic switch frame 52. Attached to the frame 52 at one end thereof and by means not shown is a first insulator 62. The first insulator 62 is shown supporting a support plate 60 having at one end thereof attached a first contact 56. The other end of bimetallic switch frame 52 is seen supporting a second insulator 64 attached thereto by means not shown. The second insulator 64 supports a bimetallic element 54. The other end of the bimetallic element 54 has attached to it a second contact 58 which normally rests against the first contact 56. Approximately one third of the length of the bimetallic switch frame 52 from the end where the second insulator 64 is attached is a threaded hole 68. The threaded hole 68 is provided within the frame 52 for an adjusting screw 66. The adjusting screw 66 has a slot 67 at one end proximate to the adjustment opening 40 for receiving an adjusting tool. The adjusting screw 66 has at its other end a third insulator 70 attached thereto. The third insulator 70 contacts the bimetallic element 54 as shown. The end of the bimetallic element 54 outside of and adjacent to the second insulator 64 has a first wire opening 71 for receiving a first wire 72. Similarly, the end of the support plate 60 outside of and adjacent to the first insulator 62 has a second wire opening 73 for receiving a second wire 74 therein.

FIG. 3 shows a schematic of one form for the electrical connection of the present invention together with the lamp it serves. Within the dashed lines of FIG. 3 is a first embodiment heat flow detector 38A of the present invention. Power input to the first embodiment heat flow detector 38A is from a first input terminal 76 and a second input terminal 88 connected to the source of input power. Output of the heat flow detector 38A is from a first output terminal 77 and a second output terminal 87. Connected to the first and second output terminals 77 and 87 is a first fixture lamp 86 which is to be energized by the output of the heat detector 38. Within the heat flow detector 38 is a first input 78 to the bimetallic switch 80, terminal 76 and input 78 being directly connected one to the other. A first output 82 is connected to the first input 78 by a first bimetallic switch 80 disposed therebetween. A first heat generating resistor 84 is disposed within the first form heat detector 38A and in parallel with the first fixture lamp 86.

FIG. 4 illustrates in schematic embodiment the second embodiment of electrical connection for the present invention together with the lamp that it serves. Shown within the dashed lines is a second embodiment heat detector 38B of the present invention. Power input to a second fixture lamp 100 is obtained from a second output terminal 91 and a third input terminal 102. The current which enters the second output terminal 91 is obtained from a second input terminal 90 which is directly connected to the power source as is the third input terminal 102. Disposed between the second input terminal 90 and the second output terminal 91 is the second form heat detector 38B. Within the heat detector 38B is a second bimetallic switch 94 having an input 92 directly connected to second input terminal 90. A second output 96 from the second bimetallic switch 94 is connected to one end of a second heat generating resistor 98. The other end of the heat generating resistor 98 is connected to the second output terminal 91 as shown.

The heat flow detector of the present invention will be better understood from the following operative discussions taken together with the drawings herein before described.

FIG. 1 depicts the situation that exists when the high hat fixture 14 is installed in the hung ceiling 12. Typically all electrical connections are made inside the junction box 30. The installation 10 shows the high hat fixture 14 surrounded by air thereby safely dissipating its internally generated heat. The temperature at the junction box 30 is therefore low compared to the temperature of the high hat fixture 14. If the fixture 14 and the box 30 became surrounded or covered by heat insulation which forms a pocket into which fixture 14 and box 30 fit, the heat dissipated by the fixture 14 will heat the air in the pocket. The aforementioned situation is a distinct possibility if thermal insulation is blown or foamed into the space within the hung ceiling. When the afore described conditions exist the temperature at the heat flow detector 38 will increase. The heat generated by the resistor 42 will be prevented from being dissipated causing further temperature increase at the heat flow detector 38. The adjusting screw 66 is adjusted so that the bimetallic element 54 will open the connection between contacts 56 and 58 when the temperature in the hung ceiling area proximate to the high hat fixture 14 is liable to damage insulation or lead to a fire.

Pertinent details of the detector body 44 are shown in FIG. 2. The frame 52 which supports the bimetallic element 54 together with the support plate 60 contributes to forming the bimetallic switch. What is shown here is a mechanical switch which employs a bimetallic element to sense temperature. The bimetallic element will change shape as the temperature is raised. The moderate bow assumed by the bimetallic element 54 shown in FIG. 2 will become more pronounced with an increase in temperature. As the bow increases first contact 56 will move away from second contact 58 opening the electrical circuit between first wire 72 and second wire 74. The adjusting screw 66 allows the temperature at which contacts 56 and 58 open to be preset before or after the heat flow detector 38 is installed in the junction box 30. The bimetallic sensor herein described does not limit the method of temperature sensing to be employed with the present invention. A mercury column temperature sensor would work equally well, to mention one alternate method.

The detector body 44 is shown in FIG. 2 to be fabricated of a nonconductive plastic, it is also possible to make the heat flow detector 38 operative with a metal detector body 44, the selection of material being a function of the desired body 44 characteristics.

Further, when detector body 44 is attached to the junction box 30 as shown in FIG. 1 junction box 30 is generally not of a so-called waterproof construction. Consequently, junction box 30 has openings at the edges and corners which permit air to circulate through the junction box 30. Therefore, air will circulate through the detector body 44 as well. Heated air within detector body 44 will tend to leave through adjustment opening 40. The detector body 44 is shown in preferred form as having adjustment opening 40 open operation of the heat detector 38 can be achieved, albeit at a different setting of adjusting screw 66, by closing off adjustment opening 40.

The first embodiment of heat flow detector 38A is schematically shown in FIG. 3. In the first embodiment of heat flow detector 38A the first heat generating resistor 84 is in parallel with the first fixture lamp 86. This configuration permits resistor 84 to be a relatively large resistance valve. The large resistance valve is easier to manufacture and/or obtain. In this preferred embodiment the first resistor 84 is shown in FIG. 1 as the resistor 42 attached to the outside of the detector body 44. It may be desirable to locate resistor 42 within the detector body 44 and the heat flow detector 38 will still be operable as intended in the present invention. Although the first form of heat flow detector 38A will easily detect ambient temperature conditions leading to the deterioration of insulation and fixture parts as well as fires it will not be most sensitive to overlamping. During normal operation of the first fixture lamp 86 the presence of the heat flow detector 38A is not noticed. As the operating conditions for first fixture lamp 86 worsen, and its temperature rises, first bimetallic switch 80 will open at a preset temperature. When bimetallic switch 80 opens it disconnects first fixture lamp 86 and first heat generating resistor 84. As the lamp 86 and resistor 84 cool down the temperature will decrease and bimetallic switch 80 will sense the decreased temperature and reconnect lamp 80 and resistor 84. If conditions at the first fixture lamp 86 have not improved switch 80 will open again. This cyclical opening of switch 80 will serve as a warning that the recessed fixture should be inspected.

While the second form heat detector 38B is similar in operation to the aforedescribed first form heat detector 38A the second form 38B is more sensitive to overlamping of the second fixture lamp 100. The second heat generating resistor 98 has been chosen to generate a desired amount of heat with the second fixture lamp 100. Since the same current flows through second resistor 98 and second lamp 100 the second embodiment heat detector 38B is more responsive to overlamping than the first embodiment heat detector 38A.

While the present invention has been disclosed in connection with the preferred embodiment thereof, it should be understood that there may be other embodiments which fall within the spirit and scope of the invention as defined by the following claims.

What is claimed:

1. A heat flow detection system for recessed incandescent fixtures, said system comprising:
   a junction box located proximately to an electrical lighting apparatus, said junction box comprising means for containing an end of a cable from a power source, an end of a cable connectable to said electrical lighting apparatus, and an end of a cable connectable to a switch;
   a heat flow detector body integrally connected to said junction box;
   a temperature sensitive switch located within said heat flow detector body and connected in series between said power source and said electrical lighting apparatus, said temperature sensitive switch being capable of being preset to open at a desired temperature whereby said electrical power source and said electrical lighting apparatus are disconnected from each other; and
   a source of heat attached to said heat flow detector body for maintaining the temperature within said body at a predetermined value such that limited variations in ambient temperature adjacent to said enclosure will not cause said temperature sensitive switch to open.

2. The heat flow detector system of claim 1 wherein said electrical lighting apparatus comprises an incandescent bulb.

3. The heat flow detector system of claim 1 wherein said source of heat is a resistor electrically connected to said temperature sensitive switch.

4. The heat flow detector system of claim 3 wherein said resistor is connected in parallel with said electrical lighting apparatus.

5. The heat flow detector system of claim 3 wherein said resistor is connected in series between said temperature sensitive switch and said electrical lighting apparatus.

6. The heat flow detector system of claim 1 wherein said temperature sensitive switch comprises a bimetallic switch frame, a first insulator attached to a first end of said bimetallic switch frame, a second insulator attached to a second end of said bimetallic switch frame, a first contact attached to said second end of said bimetallic switch frame, a bimetallic element mounted within said heat flow detector body and at a first of its ends separated from said bimetallic switch frame by said first insulator, and having at a second end thereof a second contact when said switch is closed.

7. The heat flow detector system of claim 6 wherein said heat flow detector body has an adjustment opening, said bimetallic switch frame has a threaded hole, and said heat flow system comprises an adjusting screw which fits in said threaded hole and has a slot in its head for receiving an adjusting tool which can be passed into the interior of said heat flow detector body through said adjustment opening.

* * * * *